Nov. 6, 1951     A. HARPER     2,574,033
LUGGAGE LOCK
Filed Dec. 20, 1947     4 Sheets-Sheet 1
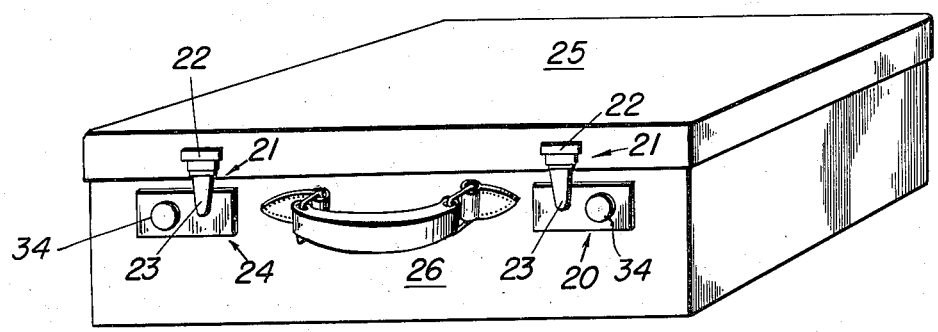
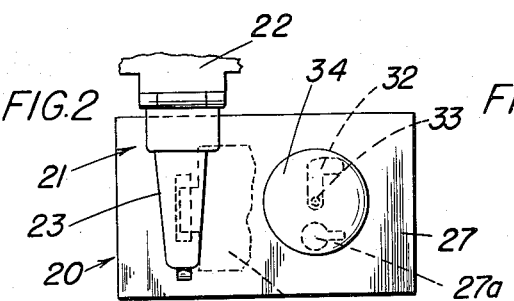
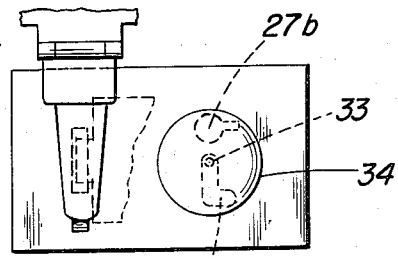
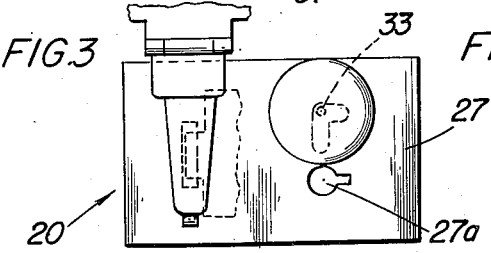
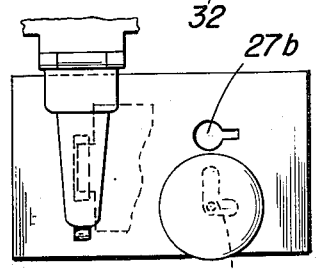
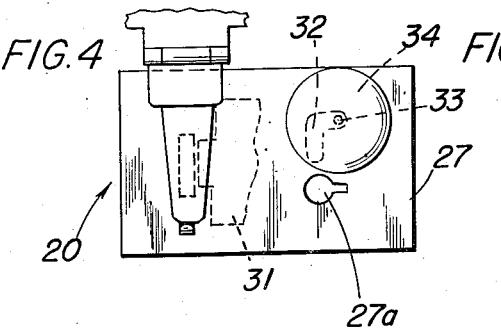
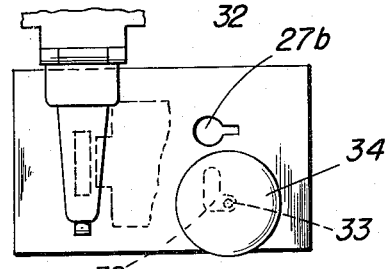
INVENTOR.
ADOLF HARPER.
BY Henry J. Lucke
ATTORNEY

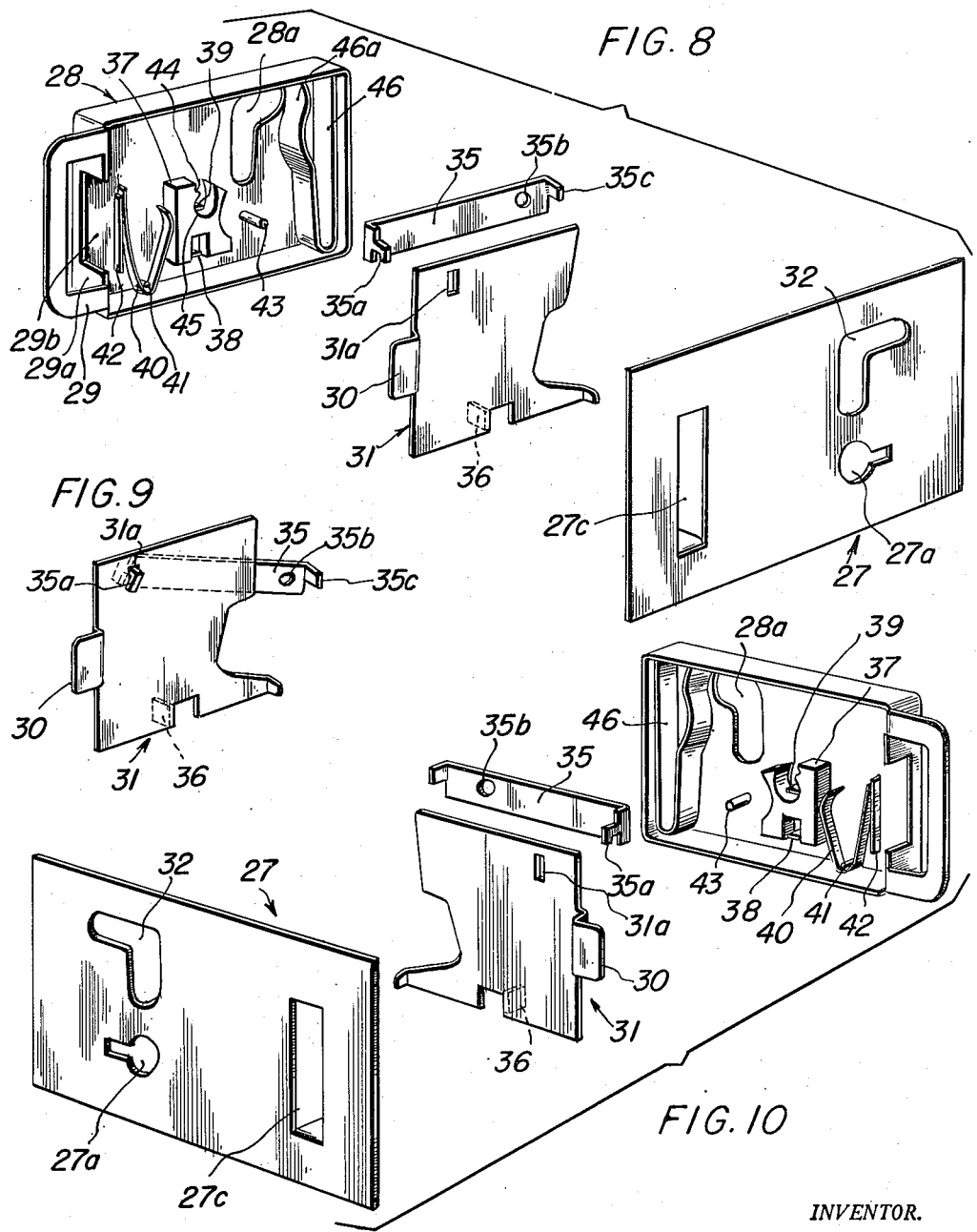

Nov. 6, 1951      A. HARPER      2,574,033
LUGGAGE LOCK
Filed Dec. 20, 1947      4 Sheets-Sheet 3
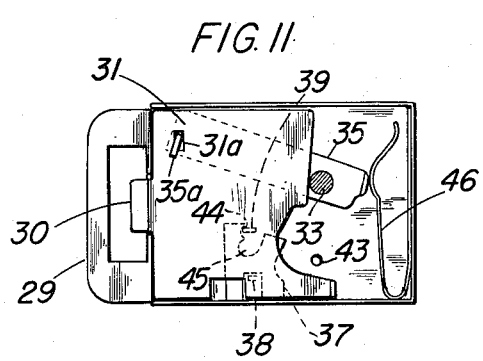
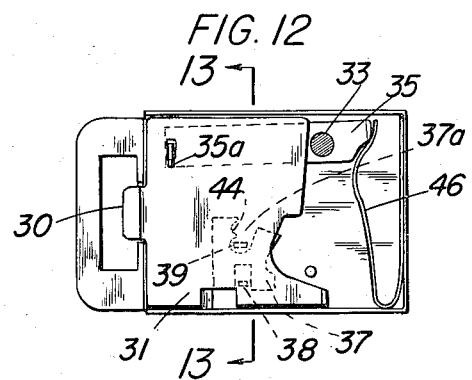
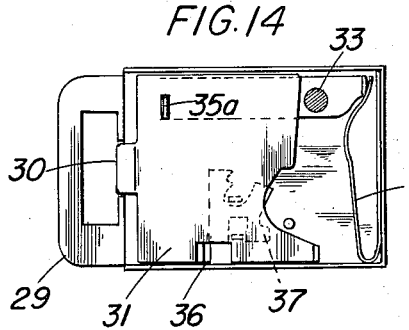
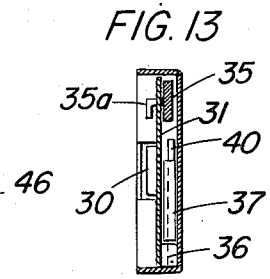
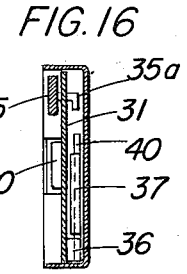
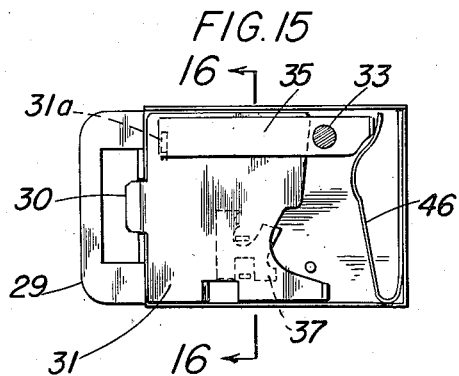
INVENTOR.
ADOLF HARPER
BY
ATTORNEY Nov. 6, 1951  A. HARPER  2,574,033
LUGGAGE LOCK
Filed Dec. 20, 1947  4 Sheets—Sheet 4
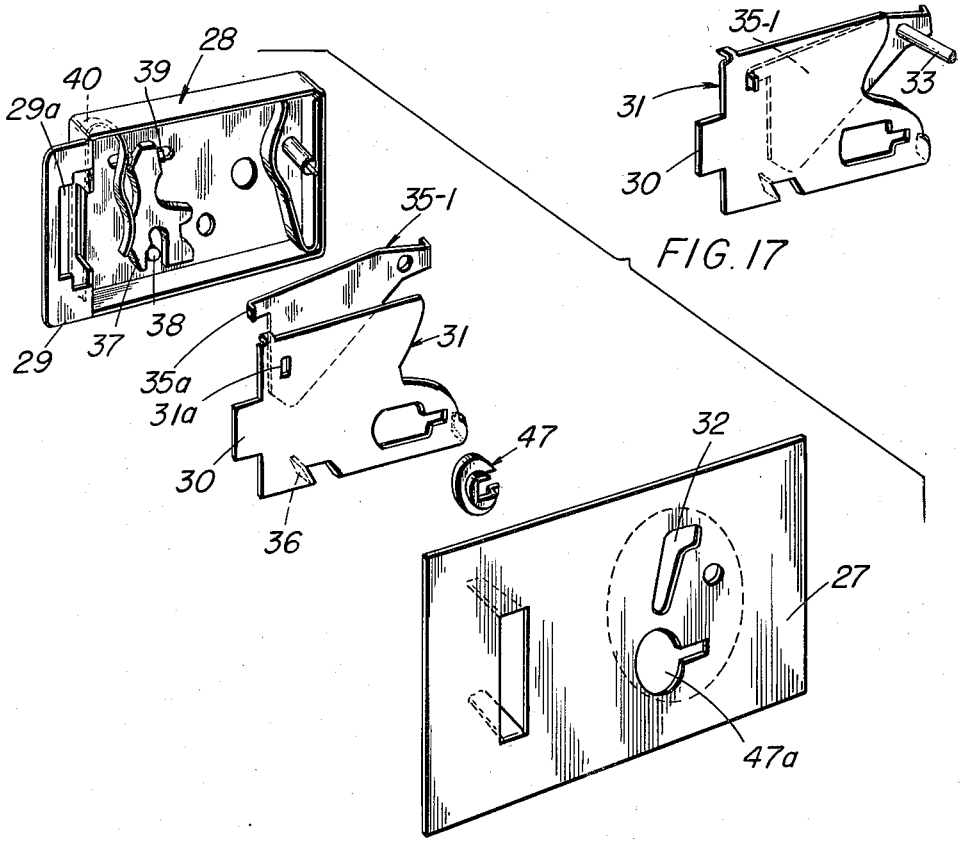
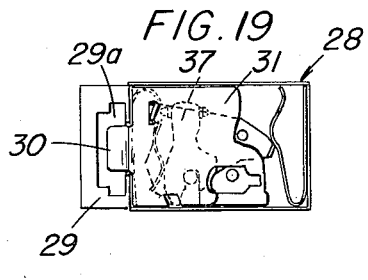
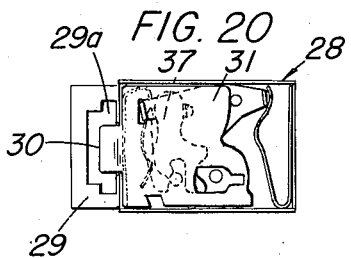
INVENTOR.
ADOLF HARPER
BY
ATTORNEY Patented Nov. 6, 1951

2,574,033

UNITED STATES PATENT OFFICE 2,574,033

LUGGAGE LOCK

Adolf Harper, Middletown, Conn.

Application December 20, 1947, Serial No. 792,871

4 Claims. (Cl. 70—74)

The invention relates to improvements in locks.

Embodiments of the invention are particularly applicable as locks for luggage, such as trunks, valises, suit cases, brief cases, and the like. Conventional locks employed in the above categories are so-termed right hand and left hand locks, affixed to the luggage respectively adjacent its respective right hand and left hand lateral sides, in the case where there are two locks used on an individual piece of luggage.

Conventionally, such locks cooperate with hasps, the hasps being secured to one of the hinged parts of the luggage and the lock per se to another hinged part of the luggage, such as the lid and body in the instances of valises and other hand luggage.

Locks pursuant to the invention are characterized by the provision of a button or knob which normally conceals the key hole in the front or cover plate, the button or knob functioning further as a manipulating member for shifting the slide bolt of the lock to release the hasp from the lock per se. Variant types of locks pursuant to the invention afford positioning of the key hole either below or above, in both instances under, the button or knob when the latter is in its normal position, i. e., below or above the right angular slot in the front or cover plate.

A further characteristic of locks constructed pursuant to the invention is the employment of essential component parts in duplicate in the assembly of right hand and left hand locks.

In general, the front or cover plate is provided with a slot for receiving the slotted or eye member of the hasp, also a hole for the entry of the key, and an angularly formed slot through which passes the stud of the button or knob. The displaceable parts of the mechanism per se are housed within a box. Suitable means are provided for securing the front or cover plate to the box housing the mechanism, and the complete unit to the material of the luggage.

The box is provided at the lateral side with a slot for affording movement therethrough of the tongue of the slide bolt and also with a slotted extension projecting from such lateral side for the reception of the slotted or eye member of the hasp, thus securing the hasp relative to the lock.

The instant lock has an important feature in that accidental opening of said lock is precluded by bi-directional movement of said button.

Further features and objects of the invention will be more fully understood from the following detailed description and the accompanying drawings in which—

Fig. 1 is a perspective diagrammatic view of a typical piece of luggage, namely a valise equipped with right hand and left hand locks respectively constructed pursuant to the invention.

Fig. 2 is a detail front elevation of a preferred embodiment of lock pursuant to the invention and a coacting hasp, the hasp being shown in secured position with the lock per se and the button or knob in its normal position concealing the key hole, the slide bolt being indicated in locking relation with the hasp.

Fig. 3 is a view similar to that of Fig. 2 but showing the button or knob moved upwardly in the vertical portion of its right-angular slot, such movement of the button or knob retaining the slide bolt in secured or unreleased relation with the hasp. Such movement of the button or knob exposes the key hole.

Fig. 4 is a view similar to that of Figs. 2 and 3, but showing the button or knob continued in its movement in its slot, namely to the terminus of the horizontal portion of its slot, by which movement the slide bolt is retracted to free or release the hasp.

The lock illustrated in Figs. 2, 3 and 4 typifies a right hand embodiment of the invention in which the key hole is below the right-angular slot in the front or cover plate required for the button or knob.

Figs. 5, 6 and 7 typify a right hand embodiment of the invention, in which the key hole is above the right-angular slot in the front or cover plate required for the button or knob.

Fig. 5 is a front elevation corresponding to that of Fig. 2, the corresponding parts being shown in like relative positions. Fig. 6 corresponds to the showing of Fig. 3 and Fig. 7 corresponds to the showing of Fig. 4.

Fig. 8 is an exploded perspective view of the essential parts of a lock of the right hand type as illustrated in Figs. 2 3, and 4; this view shows the slide bolt positioned in front of its associated link;

Fig. 9 is a detail perspective view of the slide bolt and its link illustrated in Fig. 8, the link and the slide bolt being shown in mutually operative connection;

Fig. 10 is an exploded perspective view of the essential parts of a lock of the left hand type pursuant to the invention;

Fig. 11 is an elevational view of the box and the therein contained parts of the lock mechanism per se, the front or cover plate being removed; this view shows a right hand type of lock, the slide bolt being shown in its locked position by the locking position of the tumbler;

Fig. 12 is a view corresponding to that of Fig. 11 but showing the tumbler in its unlocking position thus releasing the slide bolt;

Fig. 13 is a transverse sectional view on line 13—13 of Fig. 12;

Fig. 14 is a view similar to that of Figs. 11 and 12 but showing the slide bolt in its retracted position, affording the release of the hasp;

Fig. 15 is a view similar to that of Fig. 11, showing the alternative arrangement of the link positioned forwardly of the slide bolt; and Fig. 16 is a transverse sectional view on line 16—16 of Fig. 15.

Fig. 17 is an exploded perspective view of the essential parts of a lock of the right hand type as illustrated in Figs. 2, 3, and 4; this view, similar to Fig. 8 shows the slide bolt 31 positioned in front of its associated link plate 35—1.

Fig. 18 is a detail perspective view of the slide bolt 31 and its link plate 35—1 as illustrated in Fig. 17. The link plate and the slide bolt are shown in mutually operative position.

Fig. 19 is an elevational view of the box 28 and the therein contained parts of the lock mechanism per se, the front or cover plate 27 being removed. This view shows a right hand type of lock, the slide bolt 31 being shown in its locked position with the tumbler 37.

Fig. 20 is a view corresponding to that of Fig. 19 but showing the tumbler 37 in its unlocked position with the slide bolt released.

Reference is made to the embodiment of the invention illustrated specifically in Figs. 2, 3, 4, 8, 9, 11, 12, 13, and 14, namely of a typical right hand embodiment of the invention. The lock per se is designated generally 20; the hasp is designated 21 and is shown comprising a base plate 22 which is secured to the material of the hinged lid or other movable part of the luggage; the locking member 23 is hingedly connected to the base plate 22, usually with a biasing spring; the locking member 23 is provided with a slotted or eye member arranged to be brought into hasp securing position by the tongue of the slide bolt projecting through the slotted extension of the box.

In the illustrative Fig. 1, the right hand lock is designated 20 and its cooperating hasp designated 21; the left hand lock is designated 24 and its hasp 21, the two hasps 21, 21 being shown secured at their respective base plates to the material of the lid 25 of the illustrated suit case, the two locks 20, 24 being secured to the material of the front side 26 of the suit case body.

Referring now to the lock pursuant to the invention, and firstly to its right hand embodiments, the front or cover plate is designated 27; the box or box-like casing 28 is shown provided at a lateral side with an extension 29 having a vertical slot 29a for the reception of the slotted or eye member of the hasp. The box 28 is further provided at said lateral side with a vertical slot 29b for movement therethrough of the tongue 30 of the slide bolt 31, cooperating with the slot 29a to hold the hasp in secured position.

The front or cover plate 27 is provided with an angular or L-shaped slot designated 32, shown of right angular configuration; through the slot extends the stud 33 of the button or knob 34.

The key hole designated 27a provided in the front or cover plate 27 may be disposed either below the angular slot 32 as appears from Figs. 2, 3, 4, 8, and 10 or above the angular slot 32 as appears from Figs. 5, 6, and 7, in which latter instance the key hole is designated 27b.

The slide bolt, designated 31, has at one edge a tongue 30. Associated with the slide bolt 31 is the link 35 which optionally may be disposed either rearwardly of the side bolt as illustrated in Figs. 8, 9, 11, 12, 13 and 14, or forwardly of the slide bolt as illustrated in Figs. 15 and 16. The association of the link 35 rearwardly of the slide bolt 31, as illustrated in Figs. 8, 9, 11, 12, 13, and 14, is by the provision of a lug 35a optionally offset at one end of the link 35 which is inserted for pivotal action in the slot 31a in the slide bolt 31. The link 35 is actuated in the operation of the lock mechanism by connection with the stud 33 of the button or knob 34; this connection may be had by passing the rearward end portion of the stud 33 through an opening 35b in the link 35, and peening its rearward end, an angular slot 28a in the base of the box 28 providing a clearance for the peened rear end of the button stud 33, in its movement in the slot 32. In the construction, as illustrated in Figs. 15 and 16, wherein the link 35 is disposed forwardly of the slide bolt 31 clearance for the peened end of the stud 33 is provided laterally of the slide bolt 31 by its thickness. In this construction, the peening of the rear end of the stud 33 is made possible by providing any suitable opening in the base of the box 28, affording entry of the peening tool.

The slide bolt 31 is further provided with an extension 36 in the form of an ear had by shearing the material of the slide bolt and bending the thus obtained ear 36 rearwardly of the body of the slide bolt. This ear 36 cooperates with the tumbler 37 to secure the slide bolt in its locking position when the tumbler 37 is in its lower position, see Fig. 11, ensuing upon locking movement of the key relative to the tumbler; when the key is turned in its unlocking movement, the tumbler 37 is displaced from its locking position with respect to the ear 36 and accordingly with the slide bolt 31, see Fig. 12.

The tumbler 37 may be of any suitable conventional design or construction; in essence, the tumbler is slidably mounted within the box 28 and guided in its movement by two lugs 38, 39, sheared and bent from the material of the base of the box 28. The biasing spring 40 serves to keep the tumbler 37 under spring tension in either its locking or unlocking position, pursuant to its displacement by the key of the lock. Thus the lugs 38 and 39 provide fixed means, and the spring 40 provides coacting resilient means, for holding the tumbler 37 in its respective two positions. The key and the tumbler are naturally designed or constructed in mutual arrangement providing for the locking and unlocking of the lock mechanism through the intermediation of the lock mechanism per se embodying the invention.

The lugs 38 and 39, in addition to this function of guiding the tumbler 37, serve also as abutments for the tumbler when the tumbler is in locking position with the slide bolt 31, as shown in Fig. 11, and apparent from Figs. 2 and 5. To attain efficient operation of the lock mechanism, the tumbler 37 is provided at its upper slot 37a with upper and lower notches 44, 45 respectively.

Within the box 28 and at a location opposite the slot 29b, a spring 46 is provided, serving to bias the link 35 and therewith its associated slide bolt 31 in the direction toward the slot 29b. Thus, when the button or knob 34, secured by its stud 33 to the link 35, is moved in the horizontal portion of slot 32, the slide bolt 31 with its associated link 35 are shifted in direction away from slot 29b, whereby the free end of the spring 46 is compressed, resulting in the release of the hasp part 23 from the lock per se. Upon release of the button or knob 34, and therewith the slide bolt 31 with its associated link 35, the spring 46 returns the afore-mentioned closely connected three parts to their former position, the tongue 30 of the slide bolt 31 again projecting through the slot 29b. Besides its heretofore described biasing function, the spring 46 by its concavely, curved free end portion 46a, provides continuance of nicety of engagement with the free end of the link 35. The free end of the link 35 is provided with a lug 35c functioning to engage the stated concavely curved portion 46a of the spring 46. The spring 46 is oppositely bowed adjacent its concavely curved free end portion. See Figs. 8, 11, 12 and 14. Thus the knob 34 moves the stud 33 along the vertical portion of the angular slot 32 against resilient pressure of the bowed portion of the spring 46 to uncover and cover the key hole 27a in the front cover plate 27. It is noted that the convexly bowed section of the spring 46 will assist movement of the stud 33 toward the end of the vertical portion of the slot 32 as the stud passes the mid-portion of the bowed section. In fact, the spring 46 may even actuate the button 34 and the stud 33 in their movement along the vertically extending slot portion after the mid-portion of the bowed section of the spring is passed.

The lock pursuant to the invention typified by Figs. 2, 3, 4, 8, 9, 11, 12, and 14, is assembled, assuming that the key pin 43, if any, has been secured in position, in the following manner: the tumbler 37 is placed in the box 28 in position relative to its lugs 38 and 39, then the spring 40 is positioned against the abutment 42 about its pin or lug 41, if any, the free and curved end of the spring 40 engaging the tumbler 37. Thereafter, the link 35 is assembled with respect to the slide bolt 31, and this sub-assembly then placed in the box 28, then the spring 46 is placed in the box 28 as its hereinabove designated location, its concavely curved free end portion 46a engaging the lug 35c of the link 35. The front or cover plate 27 is then suitably secured to the box 28 conatining the mechanism parts and finally the button or knob 34 is assembled with the unit by inserting the stud 33 of the button or knob 34 into the hole 35b of the link 35 through the angular slot 32 in the front or cover plate 27, and by peening the end of the stud 33.

To lock the right hand lock illustrated in Figs. 2, 3, 4, and 8 when in latched position, the following procedure is employed. The knob 34 is pushed upwardly thus exposing the key hole 27a. With the knob in this position, the spring 46 bears resiliently upon the lug 35c at the free end of the link 35 thus holding the slide bolt 31 in latched position. The key is inserted in the uncovered key hole and is rotated through an arc in counter-clockwise direction, thereby moving the tumbler 37 from its unlocked position (Figs. 8 and 12) to its locking position (Fig. 11). Continued counter-clockwise movement of the key permits it to be withdrawn through the key hole 27a without disturbing the tumbler 37.

As hereinabove explained the slide bolt 31 is thus locked in its locking relation through its tongue 30 with the slotted or eye member 23 of the hasp, held in the slot 27c of the front or cover plate 27. Upon withdrawal of the key the button or knob 34 may then be returned to key hole covering position. At the same time the free end 35c of the link 35 is moved downwardly through an arc, under resilient action of the spring 46.

In the operation of unlocking the lock, the button or knob 34 is moved upwardly to expose key hole 27a, affording entry of the key through the key hole 27a, and upon clockwise movement of the key, the tumbler 37 is shifted upwardly, thus freeing it from engagement with the ear 36 of the slide bolt 31, and the movable member 23 of the hasp may then be released by continued movement of the button or knob 34 and its stud 33 in the horizontal portion of the angular slot 32. Upon releasing the knob 34, the spring 46 bearing upon the lug 35c of the link 35 moves the slide bolt 31 to locking position. At the same time, the knob 34 is moved to the left of the horizontal portion of the angular slot 32. See Fig. 3. Upon withdrawal of the key through the key hole 27a the button or knob 34 may be moved downwardly from its position exposing the key hole 27a to the position covering the key hole 27a. See Fig. 2.

With respect to the right hand lock in which the link 35 is positioned forwardly of the slide bolt 31, and the key hole 27a disposed below the angular slot 32, as illustrated in Figs. 15 and 16, the stated slide bolt 31 and its associated link 35, the tumbler 37, and the springs 40 and 46 may be duplicates of the corresponding parts of the above described embodiment.

In general, the lock mechanism per se of the type of right hand lock having the keyhole 27b above the slot 32, is constituted essentially of a slide bolt and its associated link 35, an appropriate tumbler, the tumbler spring 40, and the link-biasing spring 46, except that in this assembly the tumbler and the tumbler spring are disposed in the upper zone within the box, bringing about the reverse movements of the key in the operation of locking and unlocking the mechanism per se. In this construction the link 35 is disposed in the lower zone within the box as compared with its respective position in the aforesaid construction typified by Figs. 2, 3, 4, 8, 9, 12, and 14, the spring 46 being inserted in the box with its free end pointed downwardly, the link 35 being disposed either forwardly or rearwardly of the slide bolt.

Figs. 17, 18, 19 and 20 show a modification of the lock from the embodiment shown in Figs. 8 through 16, in that this particular construction has the link designated 35—1 rearwardly of the slide bolt 31 but forwardly of the tumbler 37 thus sandwiching the link 35—1 between the slide bolt 31 and tumbler 37. Such construction permits the inclusion of a keyhole plate 47 to this embodiment, which when placed in its proper opening 47a of the front or cover plate 27 rides on top of the slide bolt 31 as illustrated in perspective in Fig. 18.

A lock of this type of construction may be used as a right or left hand lock according to how its various parts comprising the lock are arranged. Furthermore, as in the case of previously herein described locks, the mechanism can be so arranged that the key insertion opening 47a of front or cover plate 27 is below the angular slot 32 (see Figs. 2 to 4) or above the angular slot 32 (see Figs. 5 to 7).

I claim:

1. A luggage type lock comprising in combination, a box-like casing, a bolt having a locking tongue at one end slidably positioned between two opposed sides of said casing for guided reciprocable movement to and from a position wherein said tongue may engage a hasp, a cover plate for said casing having an L-shaped slot disposed with one branch parallel to the direction of movement of said bolt and the other branch transverse thereto, a link pivotally connected at one end to said bolt and the other end of said link extending beyond the other end of said bolt, a stud extending through said L-shaped slot and said other end of said link, and a manually operable knob secured to one end of said stud and slidable relative to said cover plate to reciprocate said bolt, said knob and stud being operable to pivotally move said other end of said link transversely to the direction of movement of said bolt and thereby dispose said stud in said transverse branch of said L-shaped slot, whereby the walls of the latter hold said stud against movement in a direction to reciprocate said bolt.

2. A luggage type lock comprising in combination, a box-like casing, a bolt having a locking tongue at one end slidably positioned between two opposed sides of said casing for guided reciprocable movement to and from a position wherein said tongue may engage a hasp, a cover plate for said casing having an L-shaped slot disposed with one branch parallel to the direction of movement of said bolt and the other branch transverse thereto, a link pivotally connected at one end to said bolt and the other end of said link extending beyond the other end of said bolt, a stud extending through said L-shaped slot and said other end of said link, a manually operable knob secured to one end of said stud and slidable relative to said cover plate to reciprocate said bolt, and a spring in said casing engaging said other end of said link and normally biasing it to move said bolt in hasp engaging direction, said knob and stud being operable to pivotally move said other end of said link transversely to the direction of movement of said bolt and thereby dispose said stud in said transverse branch of said L-shaped slot, whereby the walls of the latter hold said stud against movement in a direction to reciprocate said bolt.

3. A luggage type lock comprising in combination, a box-like casing, a bolt having a locking tongue at one end slidably positioned between two opposed sides of said casing for guided reciprocable movement to and from a position wherein said tongue may engage a hasp, a cover plate for said casing having an L-shaped slot disposed with one branch parallel to the direction of movement of said bolt and the other branch transverse thereto, a link pivotally connected at one end to said bolt and the other end of said link extending beyond the other end of said bolt, a stud extending through said L-shaped slot and said other end of said link, a manually operable knob secured to one end of said stud and slidable relative to said cover plate to reciprocate said bolt, said knob and stud being operable to pivotally move said other end of said link transversely to the direction of movement of said bolt and thereby dispose said stud in said transverse branch of said L-shaped slot, whereby the walls of the latter hold said stud against movement in a direction to reciprocate said bolt and a key operable tumbler within said casing and movable into engagement with said bolt when in hasp engaging position to prevent movement of said bolt therefrom, said cover plate having a keyhole adjacent said L-shaped slot and said knob being of such size as to cover said keyhole when said stud is positioned in said transverse branch of said L-shaped slot.

4. A luggage type lock comprising in combination, a box-like casing, a bolt having a locking tongue at one end slidably positioned between two opposed sides of said casing for guided reciprocable movement to and from a position wherein said tongue may engage a hasp, a cover plate for said casing having an L-shaped slot disposed with one branch parallel to the direction of movement of said bolt and the other branch transverse thereto, a link pivotally connected at one end to said bolt and the other end of said link extending beyond the other end of said bolt, a stud extending through said L-shaped slot and said other end of said link, a manually operable knob secured to one end of said stud and slidable relative to said cover plate to reciprocate said bolt, and a spring in said casing engaging said other end of said link and normally biasing it to move said bolt in hasp engaging direction, said knob and stud being operable to pivotally move said other end of said link transversely to the direction of movement of said bolt and thereby dispose said stud in said transverse branch of said L-shaped slot, whereby the walls of the latter hold said stud against movement in a direction to reciprocate said bolt, said spring also engaging said other end of said link when disposed in said last mentioned position to releasably retain said stud within said transverse branch of said slot, and a key operable tumbler within said casing and movable into engagement with said bolt when in hasp engaging position to prevent movement of said bolt therefrom, said cover plate having a keyhole adjacent said L-shaped slot and said knob being of such size as to cover said keyhole when said stud is positioned in said transverse branch of said L-shaped slot.

ADOLF HARPER.

REFERENCES CITED

The following references are of record in the file of this patent:

UNITED STATES PATENTS

| Number | Name | Date |
|---|---|---|
| 889,630 | Meikle | June 2, 1908 |
| 1,287,080 | Newman | Dec. 10, 1918 |
| 2,247,249 | Morton | June 24, 1941 |

FOREIGN PATENTS

| Number | Country | Date |
|---|---|---|
| 19,111 | Great Britain | of 1914 |
| 135,603 | Great Britain | Nov. 28, 1919 |